US010731555B2

(12) United States Patent
Mohseni

(10) Patent No.: US 10,731,555 B2
(45) Date of Patent: Aug. 4, 2020

(54) MICRO-CHP GAS FIRED BOILER WITH GAS TURBINE ASSEMBLY

(71) Applicant: SAMAD POWER LIMITED, Buckinghamshire (GB)

(72) Inventor: Seyed Mohammad Mohseni, Buckinghamshire (GB)

(73) Assignee: SAMAD POWER LIMITED, Buckinghamshire (GB)

( * ) Notice: Subject to any disclaimer, the term of this patent is extended or adjusted under 35 U.S.C. 154(b) by 0 days.

(21) Appl. No.: 15/578,565

(22) PCT Filed: Jun. 1, 2016

(86) PCT No.: PCT/GB2016/051613
§ 371 (c)(1),
(2) Date: Dec. 14, 2017

(87) PCT Pub. No.: WO2016/193724
PCT Pub. Date: Dec. 8, 2016

(65) Prior Publication Data
US 2018/0156112 A1 Jun. 7, 2018

(30) Foreign Application Priority Data

Jun. 1, 2015 (GB) .................................. 1509458.4

(51) Int. Cl.
*F02C 6/00* (2006.01)
*F02C 6/18* (2006.01)
(Continued)

(52) U.S. Cl.
CPC .................. *F02C 6/18* (2013.01); *F02C 7/16* (2013.01); *F24D 12/00* (2013.01);
(Continued)

(58) Field of Classification Search
CPC ............... F02C 6/18; F02C 7/16; F24D 12/00
(Continued)

(56) References Cited

U.S. PATENT DOCUMENTS 3,961,199 A * 6/1976 Bronicki ............... F02B 37/005
290/52
4,819,423 A * 4/1989 Vershure, Jr. .......... B64D 41/00
60/778
(Continued)

FOREIGN PATENT DOCUMENTS

| CN | 1556310 A | 12/2004 |
| CN | 200993050 Y | 12/2007 |

(Continued)

OTHER PUBLICATIONS

GB Search Report for Application No. GB1509458.4 (claims 17-12) dated Aug. 24, 2015; 2pgs.
(Continued)

*Primary Examiner* — Julio C. Gonzalez
(74) *Attorney, Agent, or Firm* — Cantor Colburn LLP

(57) ABSTRACT

A micro-CHP gas boiler comprises a heat exchanger having a combustion space surrounded by a water flowpath, and a gas turbine assembly which is installed in the combustion space. The gas turbine assembly includes a generator surrounded by an annular combustion chamber and cooled by a water jacket which forms part of the flowpath, and a fuel gas compressor which is integrated into the thrust runner on the turbine rotor shaft between foil air bearings.

17 Claims, 8 Drawing Sheets

(51) Int. Cl.
*F02C 7/16* (2006.01)
*F24D 12/00* (2006.01)

(52) U.S. Cl.
CPC ...... *F05D 2250/36* (2013.01); *F05D 2250/82* (2013.01); *Y02E 20/14* (2013.01)

(58) Field of Classification Search
USPC .......................................................... 290/52
See application file for complete search history.

(56) References Cited

U.S. PATENT DOCUMENTS

| | | | | |
|---|---|---|---|---|
| 6,073,857 | A * | 6/2000 | Gordon | F02C 6/18 |
| | | | | 237/12.1 |
| 6,220,034 | B1 * | 4/2001 | Mowill | F02C 9/50 |
| | | | | 60/737 |
| 8,677,728 | B2 * | 3/2014 | Kovasity | F01D 15/10 |
| | | | | 415/173.2 |
| 8,957,539 | B1 * | 2/2015 | Ralston | F01D 15/10 |
| | | | | 290/52 |
| 2005/0058533 | A1 | 3/2005 | Belokon et al. | |
| 2008/0000238 | A1 | 1/2008 | Ribaud et al. | |
| 2008/0136190 | A1 * | 6/2008 | Lee | F01D 25/22 |
| | | | | 290/52 |
| 2008/0216461 | A1 | 9/2008 | Nakano et al. | |
| 2009/0180939 | A1 * | 7/2009 | Hagen | F01K 21/047 |
| | | | | 422/600 |
| 2016/0195017 | A1 * | 7/2016 | Vick | F02C 7/08 |
| | | | | 60/39.511 |
| 2018/0202362 | A1 * | 7/2018 | Bintz | F04D 27/0207 |

FOREIGN PATENT DOCUMENTS

| | | |
|---|---|---|
| CN | 201221414 Y | 4/2009 |
| DE | 102004031783 A1 | 1/2006 |
| EP | 0458115 A1 | 11/1991 |
| EP | 0812996 A2 | 12/1997 |
| EP | 2011978 A1 | 1/2009 |
| GB | 679026 A | 9/1952 |
| GB | 901199 A | 7/1962 |
| JP | 2001012209 A | 1/2001 |
| JP | 2002286379 A | 10/2002 |
| JP | 2005030224 A | 2/2005 |
| WO | 9519495 A1 | 7/1995 |
| WO | 9802643 A1 | 1/1998 |
| WO | 0022350 A1 | 4/2000 |
| WO | 2008020758 A1 | 2/2008 |
| WO | 2014189696 A1 | 11/2014 |

OTHER PUBLICATIONS

GB Search Report for Application No. GB1509458.4 (claims 22-27) dated Aug. 24, 2015; 2pgs.
GB Search Report for Application No. GB1509458.4 dated Jul. 15, 2015; 2pgs.
International Search Report for International Application No. PCT/GB2016/051613 dated Sep. 11, 2016; 5 pgs.

* cited by examiner

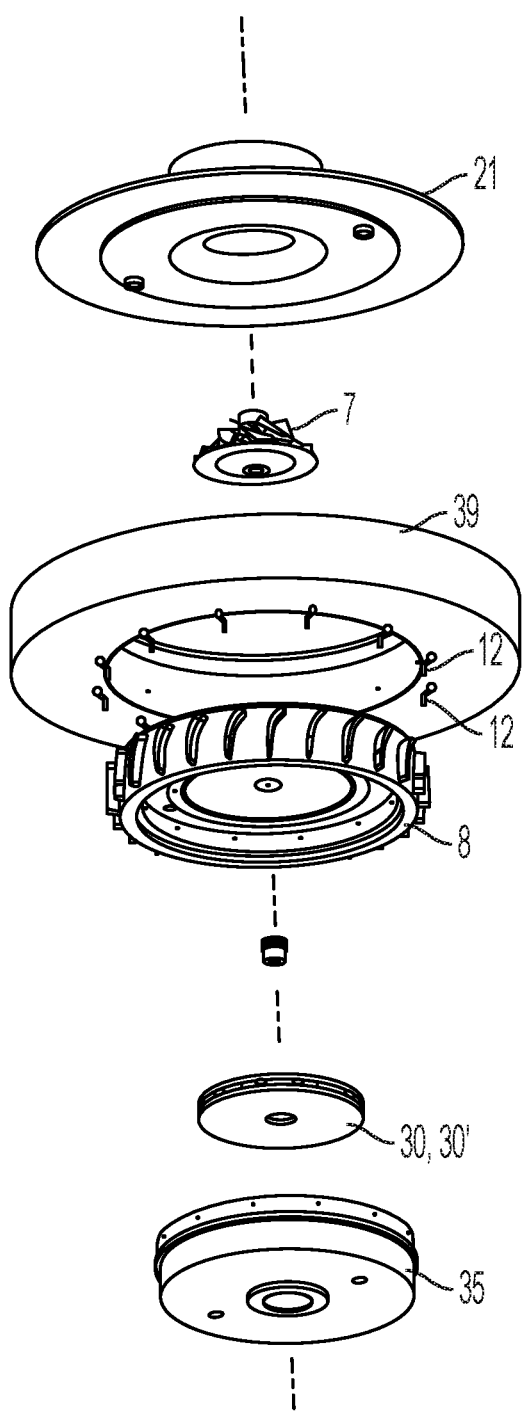
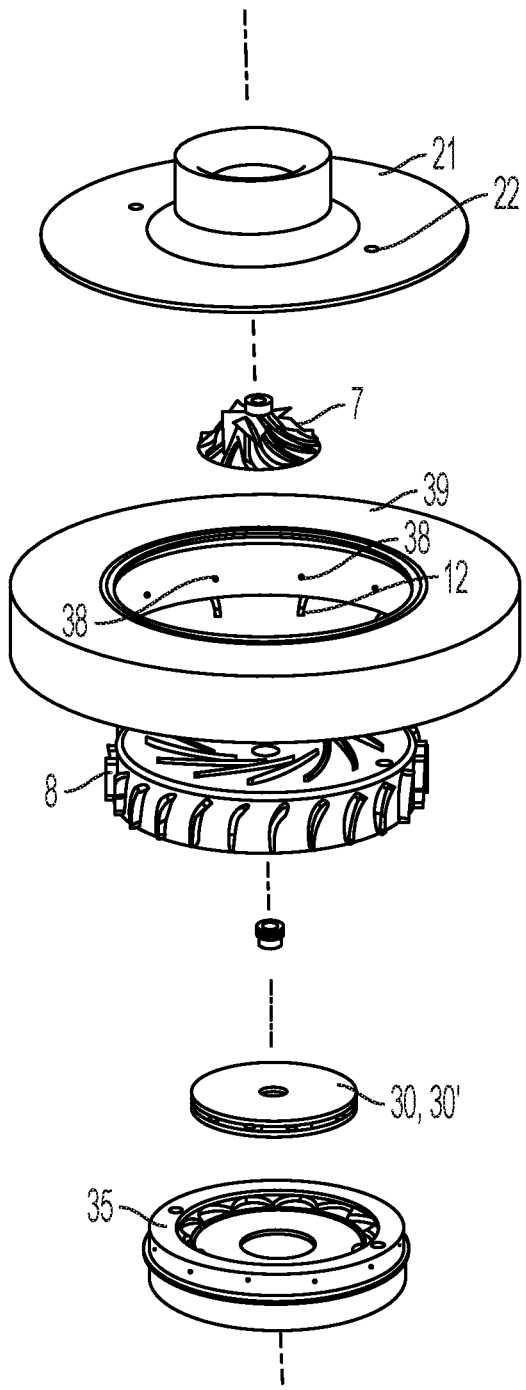
FIG. 5A
FIG. 5B

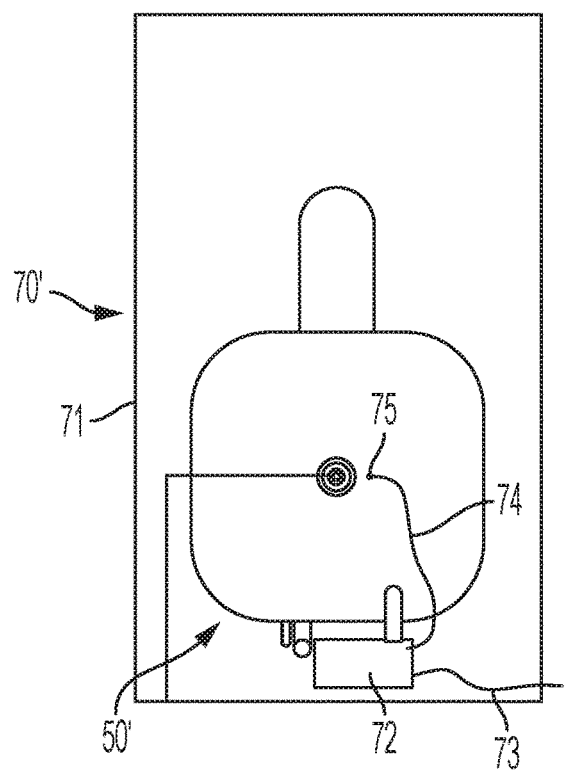
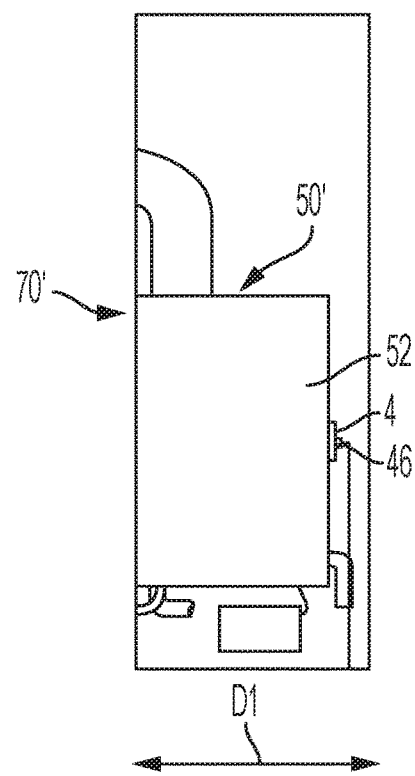
FIG. 9A
FIG. 9B
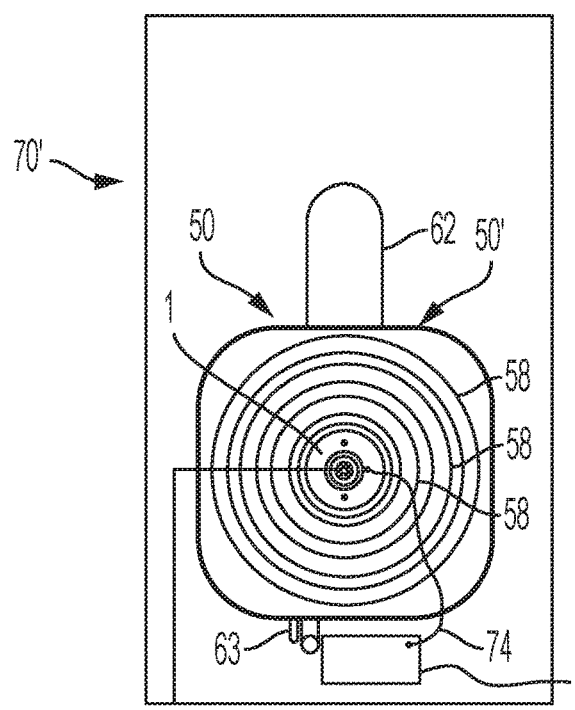
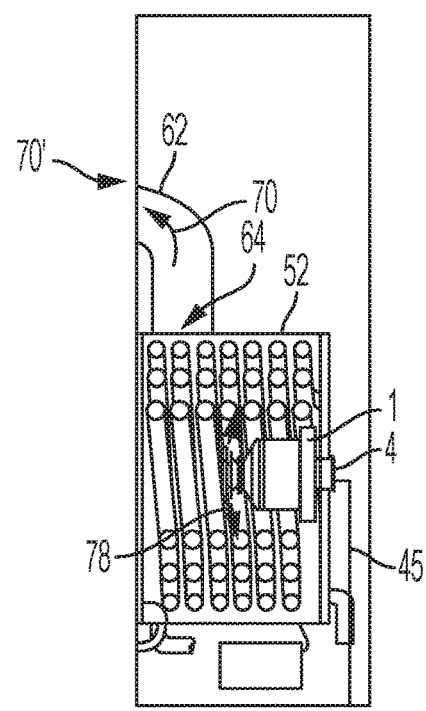
FIG. 9C
FIG. 9D

MICRO-CHP GAS FIRED BOILER WITH GAS TURBINE ASSEMBLY

CROSS-REFERENCE TO RELATED APPLICATIONS

This application is a National Stage Application of Patent Application PCT/GB2016/051613 filed on Jun. 1, 2016, which claims the benefit of and priority to Great Britain Application No. GB1509458.4, filed Jun. 1, 2015, the contents of which are incorporated herein by reference in their entirety.

BACKGROUND

This invention relates to micro-CHP gas fired boilers. In this specification, a micro-CHP gas fired boiler means a gas fired boiler that delivers combined heat and power (CHP), i.e. both heat and electrical power, on a micro scale, i.e. with a total electrical power output not exceeding the total electrical power requirements of a domestic or small commercial building in which it may be installed.

A micro-CHP boiler is typically arranged to supply the heating requirements of a domestic or small commercial building and in addition to supply electrical energy which may supply the electrical demands of the boiler and heating system, and/or may supply a proportion of the electrical demand of the building, and/or may be connected via a meter to the electrical grid so as to reduce the total financial cost of energy consumed in the building by qualifying the boiler user for financial compensation for the small amount of power generated. By way of example, a micro-CHP boiler will typically produce a total electrical output of not more than about 10 kW, typically as little as 2 kW or so, although the principle can be applied on a somewhat larger scale.

A gas turbine assembly typically comprises a rotor including a turbine rotor, an air compressor rotor and a generator rotor all mounted to rotate together as one unit on a common rotor shaft. The rotor rotates at high speed and so high speed bearings such as hydrodynamic oil bearings or foil air bearings may be used to react axial forces applied to the shaft by the turbine and the compressor. For example, U.S. Pat. No. 5,827,040 discloses a gas turbine with a thrust runner mounted on the rotor shaft between the compressor and the turbine and having foil air bearings supplied with air bled from the compressor.

A particular constraint in micro-CHP gas fired boilers is the overall size of the boiler, which in a particularly popular configuration may be wall hung, for example, in a kitchen or utility space of a domestic building. It is known to incorporate a gas turbine into such a boiler to produce the electrical output, and to provide ducting to carry the exhaust gases from the turbine into the heat exchanger which supplies the space heating and/or hot water demand of the building. However, it is difficult to avoid increasing the size of the boiler casing to accommodate the gas turbine and ducting along with its ancillary components. In wall hung boilers for domestic installation it is particularly desirable to minimise the horizontal dimension of the boiler which projects from the wall so that the boiler is compatible with the dimensional constraints of a fitted kitchen.

Since the combustion chamber of a gas turbine operates at an elevated pressure, a fuel gas compressor is required to pressurise the fuel gas supply. It is known, particularly in industrial scale gas turbines, to mount a fuel gas compressor on the turbine rotor shaft. In most micro-CHP gas fired boilers however there is insufficient space for an extended rotor shaft, and so the fuel gas compressor is powered by an electric motor and mounted inside the outer casing of the boiler as a separate unit from the gas turbine assembly. This unit is typically large and expensive.

It is important for a micro-CHP gas fired boiler to be able to compete in the marketplace with gas-fired boilers which produce only heat and not electric power, both in terms of practical installation requirements, particularly the space required for the boiler, and in terms of the additional cost of integrating the gas turbine and ancillary components with the remaining components of an otherwise conventional gas fired boiler, when compared with the financial payback from the additional electrical generating capacity over its lifetime.

It is a general object of the present invention to more satisfactorily integrate a gas turbine assembly into a gas fired boiler to provide a micro-CHP gas fired boiler, in particular by ameliorating the impact on cost, overall dimensions, and ease of manufacture.

BRIEF DESCRIPTION

Accordingly in its various aspects the present invention provides a micro-CHP gas fired boiler, a gas turbine assembly, and a heat exchanger assembly comprising a gas turbine assembly for use therein, as defined in the claims.

In one aspect, the gas turbine rotor assembly includes a thrust runner and a pair of thrust bearings arranged on opposite sides of the thrust runner to react axial forces from the air compressor and turbine rotors, wherein the thrust runner comprises a fuel gas compressor rotor which is arranged to compress the fuel gas.

In another aspect, the gas turbine assembly includes an annular combustion chamber which is arranged around the generator.

In another aspect, the heat exchanger assembly comprises a water flowpath surrounding a combustion space within an outer casing, and the gas turbine assembly is arranged within the combustion space.

BRIEF DESCRIPTION OF DRAWINGS

Further features and advantages will be apparent from the illustrative embodiment which will now be described, purely by way of example and without limitation to the scope of the claims, and with reference to the accompanying drawings, in which:

FIGS. 5A and 5B are exploded views of the principal components at the air inlet end of the gas turbine assembly, seen in two different directions;

FIGS. 9A, 9B, 9C and 9D are views of the gas fired boiler corresponding respectively to FIGS. 8A, 8B, 8C and 8D, showing the heat exchanger after installation of the gas turbine assembly to form a heat exchanger assembly.

DETAILED DESCRIPTION

Figure 1:
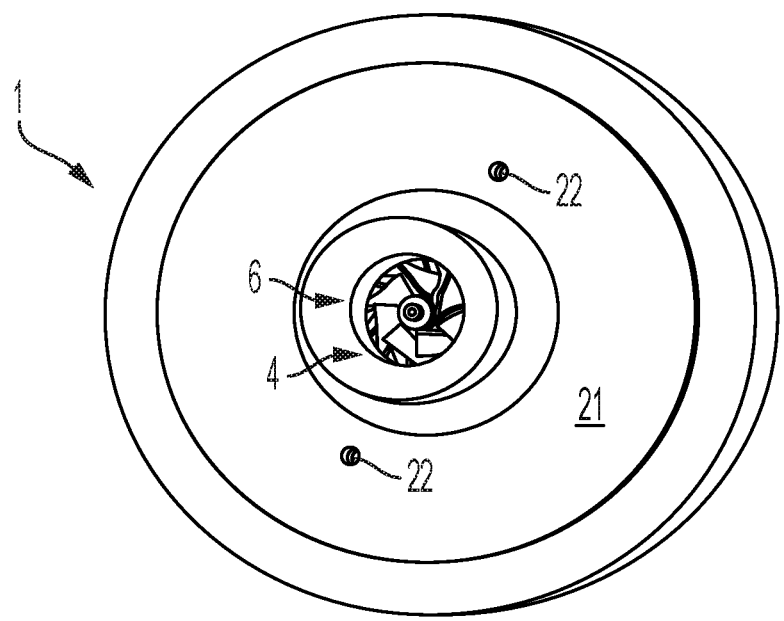
FIG. 1 and FIG. 2 show a gas turbine assembly.
Figure 2:
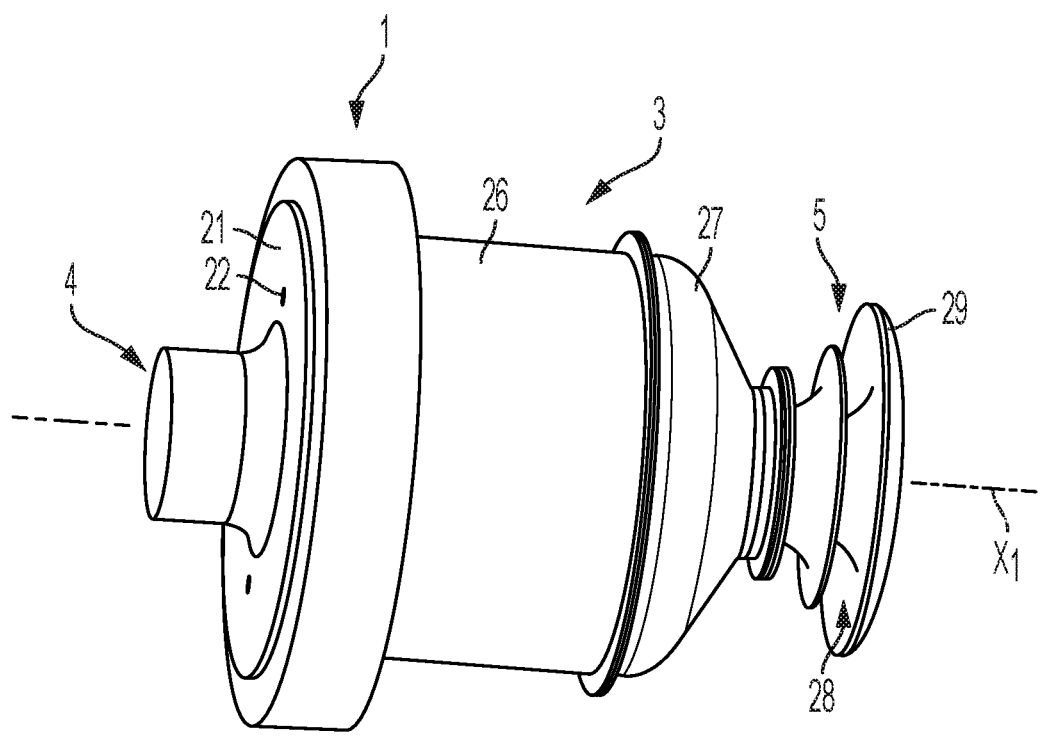
Figure 3:
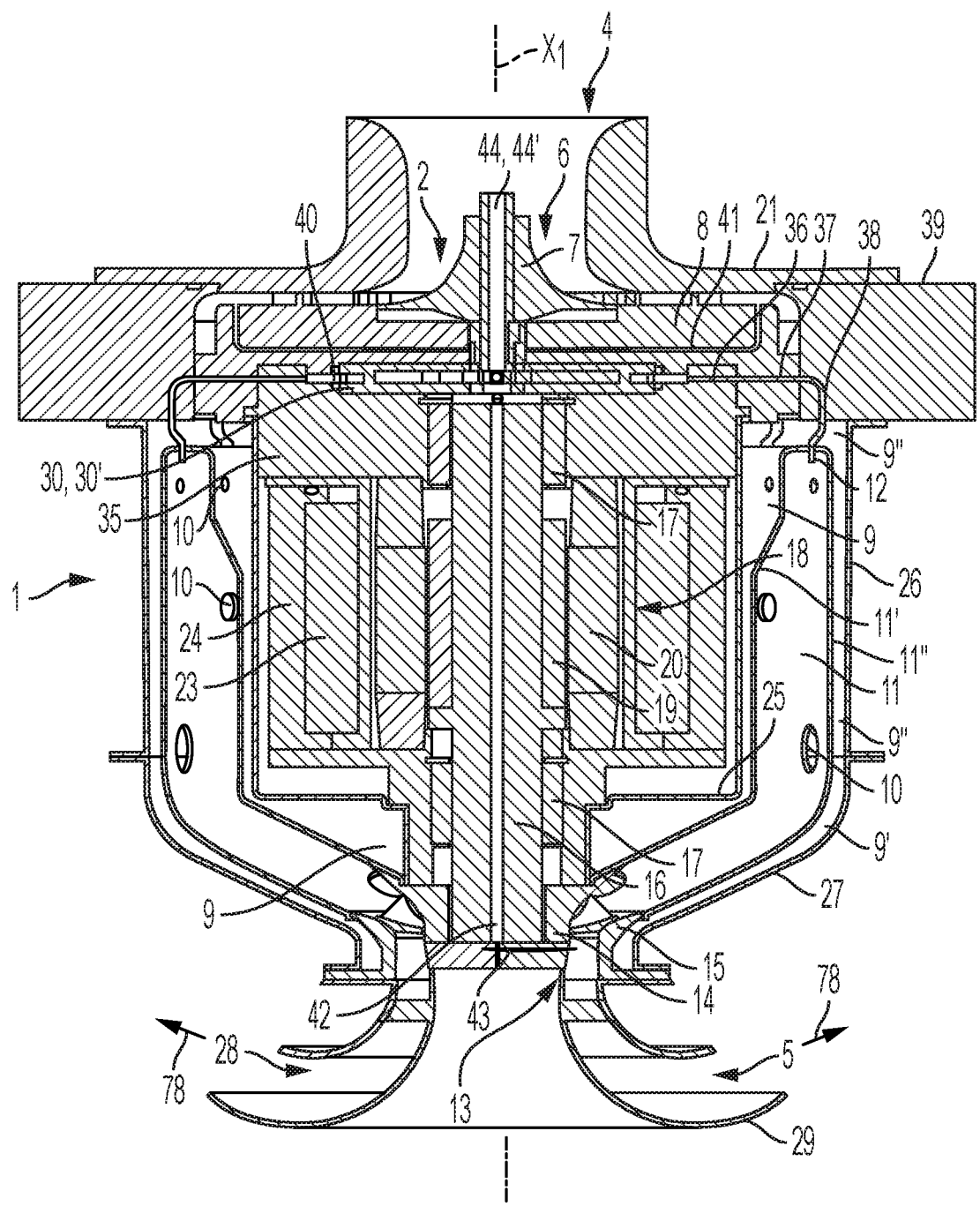
FIG. 3 is a longitudinal section through the gas turbine assembly.
Figure 4:
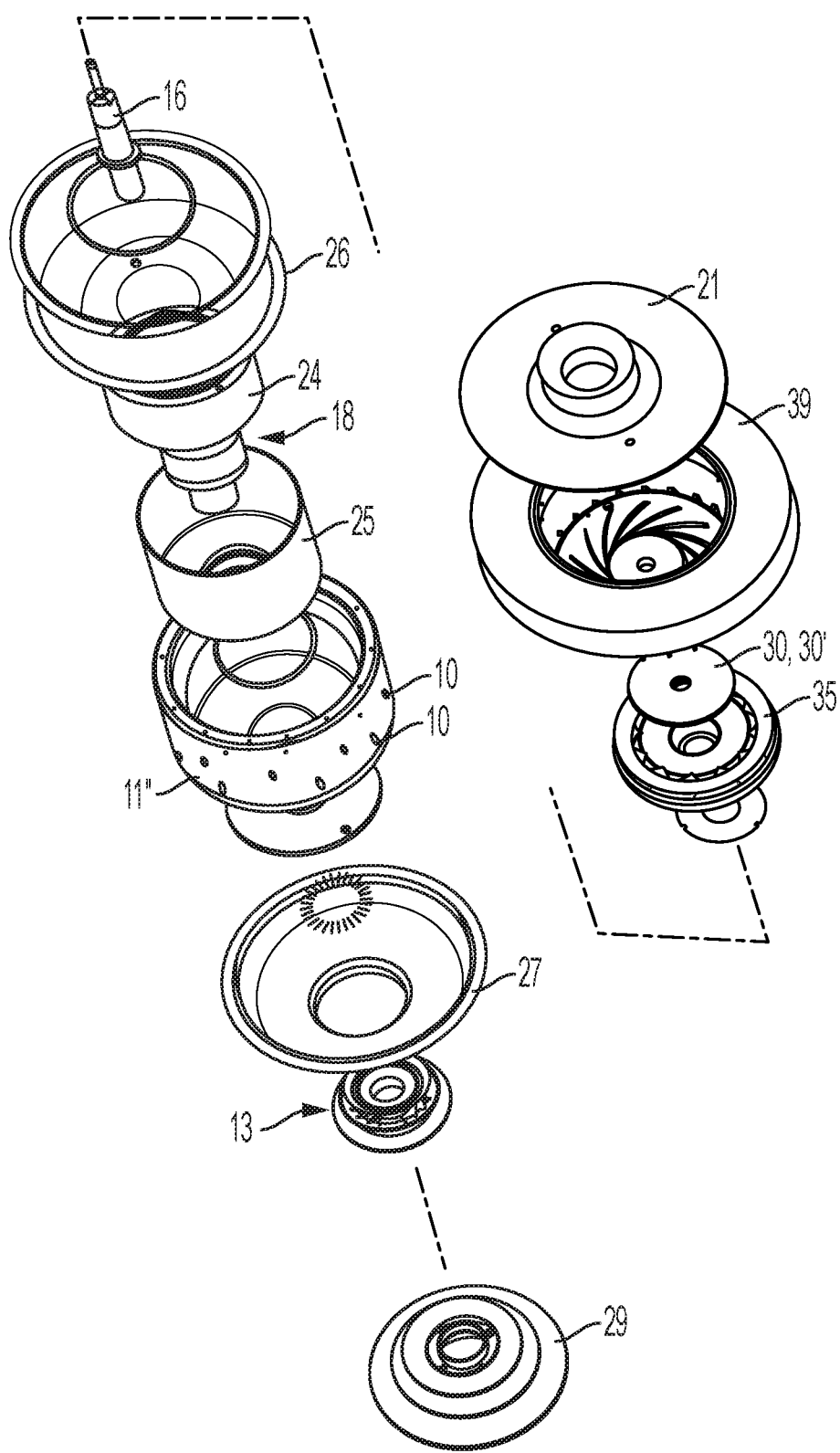
FIG. 4 is an exploded view of the principal components of the gas turbine assembly.

Reference numerals appearing in more than one of the figures indicate the same or corresponding features in each of them.

Referring to the figures, a gas turbine assembly 1 comprises a rotor assembly 2 arranged within an outer casing 3 defining an air inlet 4 and an exhaust outlet 5. An air compressor 6 comprising an air compressor rotor 7 which rotates within a static component or stator 8 is arranged to draw air into the air inlet and deliver the air at elevated temperature and pressure to annular, inner and outer plenum chambers 9, 9' from which it flows via a plurality of air inlets 10 into the combustion chamber 11.

Compressed fuel gas is introduced into the combustion chamber via fuel gas inlet nozzles 12 and combusted in the combustion chamber together with the compressed air from the air compressor rotor to produce a combustion product. The hot combustion product expands as it flows out of the combustion chamber through a turbine 13 comprising a turbine rotor 14 rotating within a static component or stator 15 to drive the turbine rotor in rotation.

The outer casing 3 includes an annular exhaust outlet 28 through which the combustion product 78 exhausted from the turbine rotor flows radially outwardly away from the gas turbine assembly. The exhaust outlet includes an exhaust deflector 29 comprising a flared shroud which diverts the combustion product flowing axially from the turbine rotor radially outwardly.

The air compressor rotor 7 and turbine rotor 14 are mounted on a rotor shaft 16 which is rotatably mounted in bearings 17. The rotor shaft extends through a generator 18 comprising a generator rotor 19 and generator stator 20. The generator rotor 19 is a permanent magnet assembly and is mounted in fixed relation to the air compressor rotor and turbine rotor on the rotor shaft 16, all of which form parts of the rotor assembly 2 which rotates as a single unit so that in operation the turbine rotor drives the air compressor rotor and the generator rotor in rotation to deliver a part of the energy of the fuel gas as electrical power via the stator 20.

The generator stator 20 is a winding with electrical connections (not shown) extending through the front plate 21 of the outer casing. The generator 18 is preferably configured as a motor/generator so that it can be used to start up the rotor assembly to a rotational speed at which the turbine rotor begins to extract energy from the expanding flow of combustion gas from the combustion chamber, which thereafter maintains it in rotation at its normal operating speed until the burner is extinguished.

The front plate 21 also has two fluid ports 22 which are arranged in fluid communication with a preferably annular water jacket 23 (which is to say, an annular space which in use is filled with water). The annular water jacket 23 is defined by a casing 24, the water jacket and casing being arranged radially outwardly of the rotor assembly and around the generator 18 between the generator and the combustion chamber 11.

The combustion chamber 11 is annular and is arranged between the annular, inner and outer plenum chambers 9, 9' which are arranged respectively radially inwardly and outwardly of the combustion chamber and which extend from a common plenum inlet space 9" which receives the compressed air from the stator 8 of the air compressor. The air inlets 10 are distributed over the radially inner and outer walls 11', 11" of the combustion chamber which separate it from the plenum chambers and which like the other high temperature components are made from a high temperature resistant metal, e.g. 316 stainless steel.

The radially inner and outer walls of the two plenum chambers are formed respectively by an inner can 25 which is spaced apart from the water jacket casing 24 to reduce the rate of heat transfer into the water jacket, and outer casing components 26 and 27.

The annular combustion chamber 11 along with the inner and outer plenum chambers 9, 9' are arranged around the generator 18 which is insulated from the heat generated in the combustion chamber by the water jacket 23. The generator 18 and the combustion chamber 11 are also arranged axially (i.e. in the axial length dimension) between the air compressor rotor 7 and the turbine rotor 14. This provides a very compact assembly, particularly in its axial length dimension which is reduced to a sufficient extent to enable the entire gas turbine assembly to be arranged in use within the combustion space 51 of a heat exchanger 50 within a wall hung gas fired boiler 70, so that the length axis X1 extends in the horizontal dimension D1 which projects from the wall in the installed position of the boiler as shown in FIGS. 9A-9D.

Figure 6:
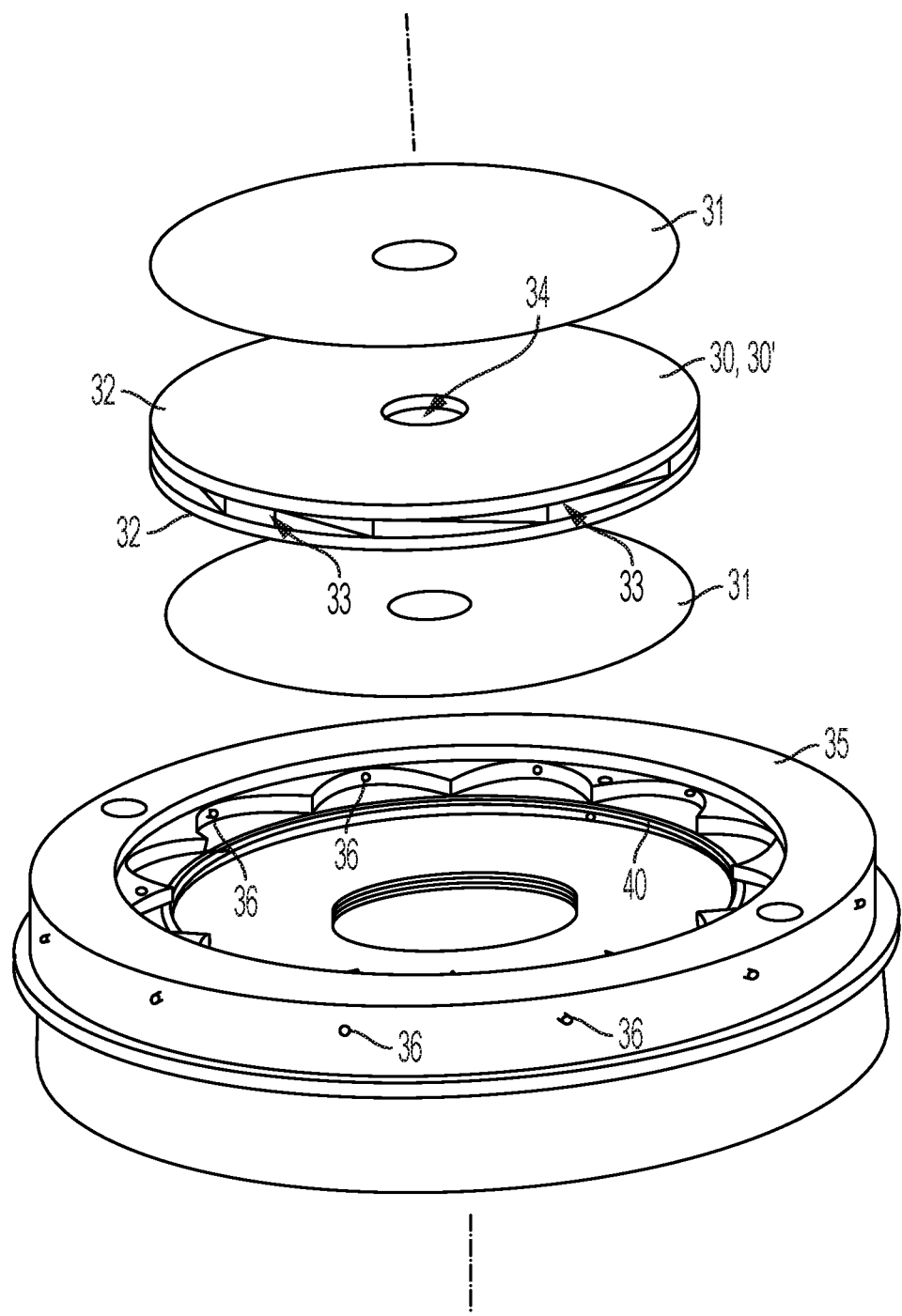
FIG. 6 shows the fuel gas compressor rotor and associated components of the gas turbine assembly.
Figure 7:
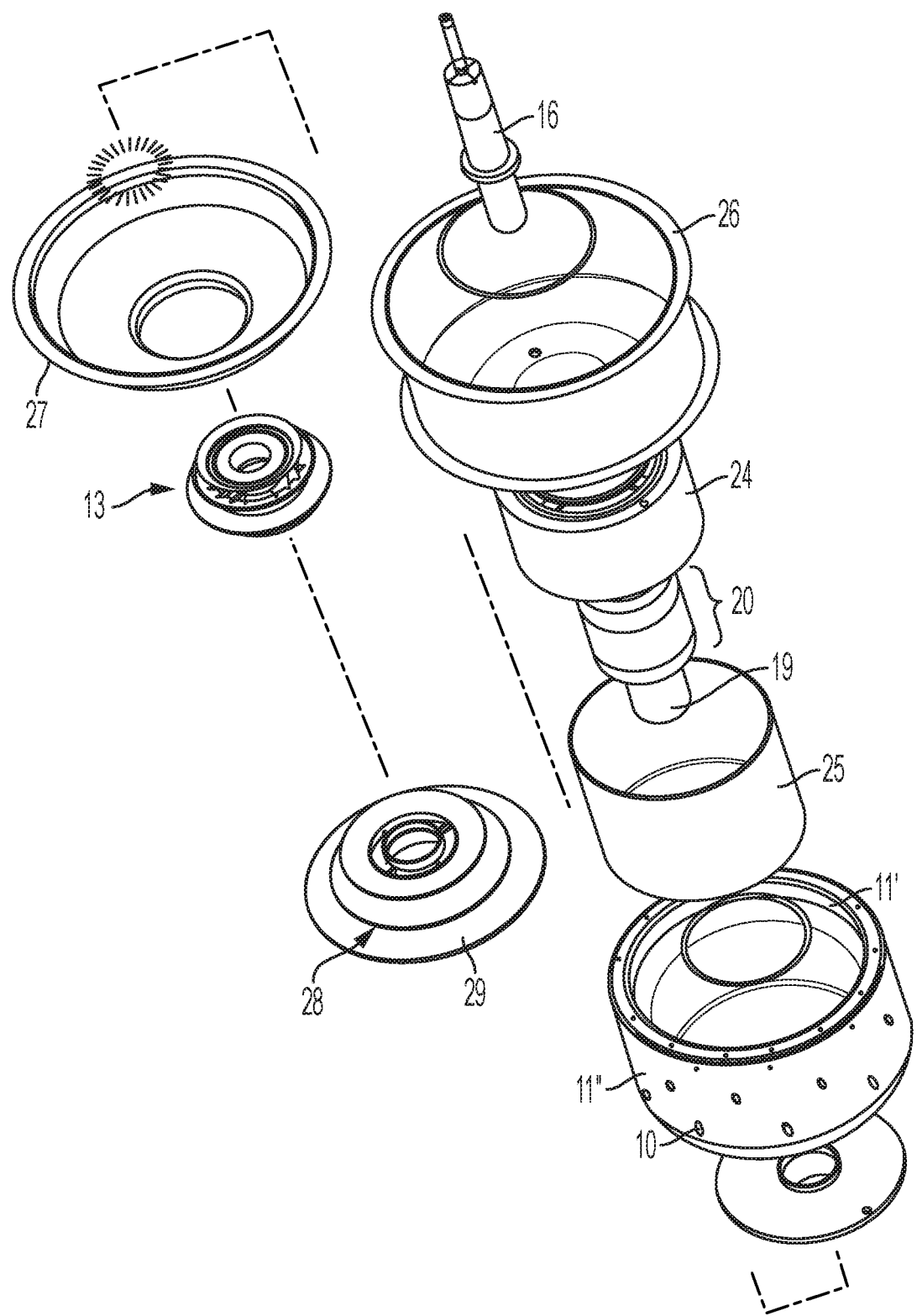
FIG. 7 is an exploded view of the principal components at the exhaust outlet end of the gas turbine assembly.
Figure 8A:
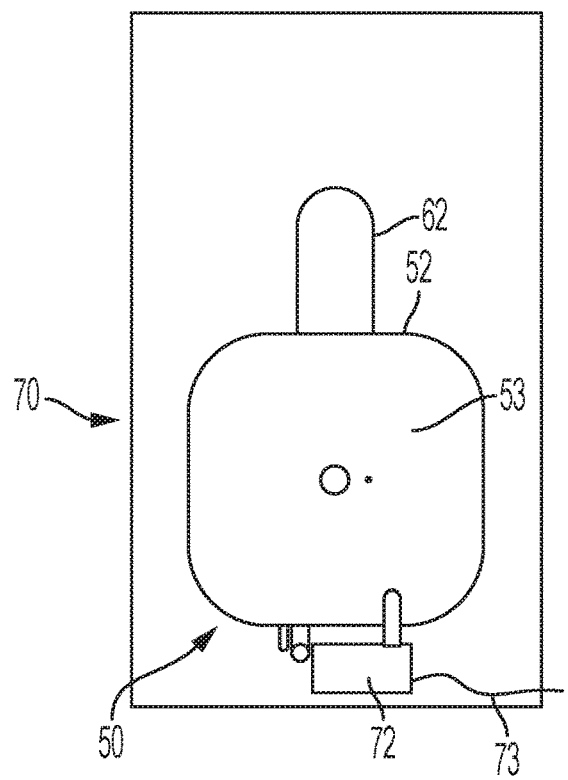
FIGS. 8A, 8B, 8C and 8D show a gas fired boiler, respectively in front view (FIGS. 8A and 8C) and side view (FIGS. 8B and 8D), with the heat exchanger cover in place (FIGS. 8A and 8B) and partially cut away to show the heat exchanger and combustion space (FIGS. 8C and 8D)
Figure 8B:
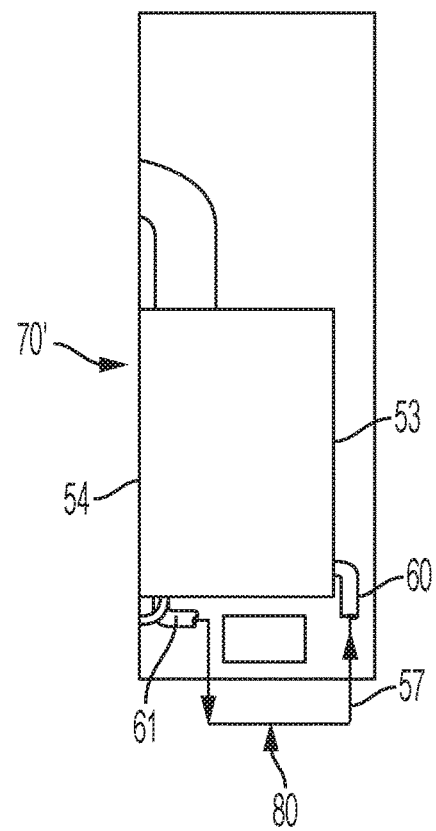
Figure 8C:
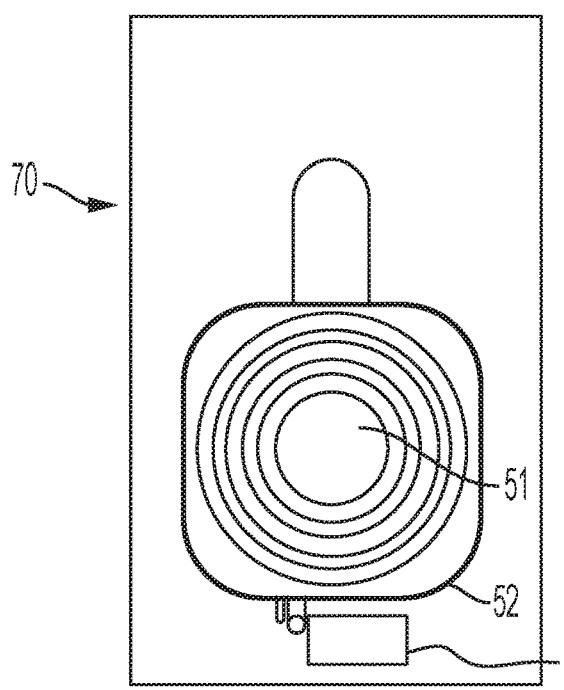
Figure 8D:
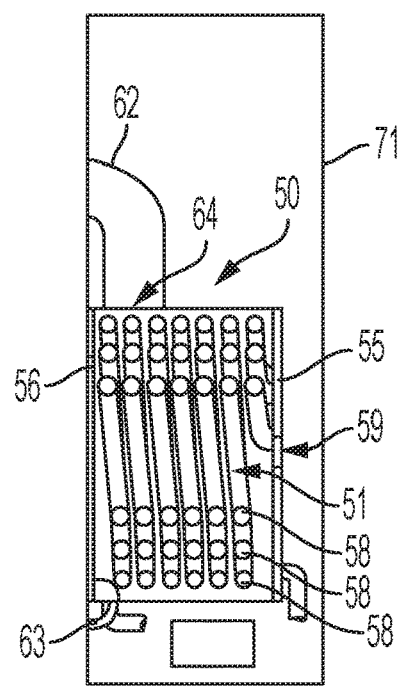

The rotor assembly 2 includes a thrust runner 30 which is mounted with the other rotor assembly components on the rotor shaft, and a pair of thrust bearings 31 (shown only in FIG. 6) arranged on opposite sides of the thrust runner to react axial forces from the air compressor and turbine rotors. In this specification, a "thrust runner" is the rotating part of a thrust bearing assembly. The thrust runner is fixed to the rotor shaft so that it cannot move relative to the rotor shaft either axially or in rotation, whereby axial forces as well as rotational torque are transmitted from the rotor shaft to the thrust runner.

The thrust runner 30 is configured to comprise a fuel gas compressor rotor 30' which compresses the fuel gas before it enters the combustion chamber. It includes two plates 32 which are spaced apart by curved passages 33 extending radially outwardly from an axially central fuel gas inlet 34 to the periphery of the thrust runner, at which the fuel gas flows into a static part or fuel gas compressor stator 35 having small diameter radial flowpaths 36 which communicate with bores passing through the outer vanes of the air compressor stator 8, the bores in turn communicating via bores 38 in the fixed collar 39 with the fuel gas inlet nozzles 12. Labyrinth seals 40 of a conventional design (not shown in detail) are arranged to seal the periphery of the thrust runner 30 comprising the fuel gas compressor rotor 30' to the stator 35. It can be seen that the fuel gas compressor including the fuel gas compressor rotor which functions as a thrust runner is axially spaced apart from the combustion chamber and fluidly connected to it by conduits formed by the bores 38 which extend in the axial direction of the shaft and through which the compressed fuel gas flows into the combustion chamber.

The fuel gas compressor rotor 30' is preferably of a radial type which generates little or no axial thrust itself while the oppositely directed axial end faces of the plates 32 are used to react the net axial thrust from the oppositely directed axial forces generated by the air compressor and turbine rotors. The fuel gas compressor rotor 30' is thus arranged to transfer axial forces from the air compressor and turbine rotors to the thrust bearings. This provides a very compact thrust bearing assembly in which the axial shaft length is minimised while obviating the need for a separate fuel gas compressor, and also ensures that the pressure of the fuel gas supplied to the combustion chamber is automatically matched to the pressure of the air irrespective of the rotational speed of the rotor assembly.

The fuel gas compressor, air compressor and turbine are all designed as known in the art so that their respective output maps of compression ratio to mass flow rate are matched, with the mass flow rate of the fuel gas being proportional to (e.g. about 1/60 of) the mass flow rate of the air from the air compressor and the pressure approximately equal. The radial type rotor provides a mass flow rate in the desired proportional range relative to that of the air compressor, which may be for example of a more efficient, centrifugal type.

Preferably the thrust bearings 31 are foil air bearings, which is to say, hydrodynamic air film bearings in which the rotating surfaces are separated by a compliant foil. The structural and functional characteristics of foil air bearings are well known in the art, and may comprise for example bumps or multiple flexible elements, and so are not described or illustrated in detail.

The foil air bearings may be supplied via bleed air passages 41 with compressed air from the air compressor rotor, which cools them (relative to the temperature in the combustion chamber) and may also provide hydrostatic support to supplement their hydrodynamic action. After flowing from passages 41 through both foil air bearings, the bleed air passes along a cooling air passage comprising a central bore 42 in the rotor shaft 16, through the rotor 19 of the generator, to a plurality of cooling air passages formed by radial bores 43 in the blades of the turbine rotor 14, and out through exit holes in the turbine rotor blade tips.

In this way, a cooling airflow is arranged to flow from the compressor via the foil air bearings to exit from the cooling air passages at the turbine rotor blade tips without passing through the combustion chamber. This cooling airflow (which is conventional in large commercial gas turbine rotor designs but not in micro scale turbines) makes it possible to reduce the tolerances between the turbine rotor and stator which in turn increases the efficiency of the gas turbine so that it can operate without a recuperator. In addition, the cooling air which exits the rotor blade tips acts as a barrier to reduce leakage of combustion gas through the rotor blade tip clearance, further increasing efficiency.

Further advantageously, by arranging for the cooling airflow to flow through the generator rotor via the cooling air passage in the rotor shaft, it also cools the generator rotor. In this way the generator is advantageously cooled both by the water jacket which removes heat from the stator and by the cooling airflow which removes heat from the rotor. This helps to make it possible to arrange the generator coaxially inside the combustion chamber, and further to mount the whole turbine assembly inside the combustion space of a heat exchanger 50, as further described below, without overheating of the generator.

The flow arrangement illustrated advantageously directs the cooling airflow sequentially through the air bearings, generator rotor and turbine rotor blade tips and so minimizes the bleed air flow rate, further enhancing overall efficiency, while the centrifugal effect of the turbine rotor helps to drive the flow. Of course, if desired, it would be possible instead to arrange for the cooling airflow to flow from the compressor through the generator rotor without passing through the foil air bearings, or to exit other than via the turbine rotor blade tips, or to flow from the compressor to the rotor blade tips without passing through the bearings and/or the generator rotor.

The pressure of the fuel gas supplied to the combustion chamber from the fuel gas compressor rotor 30' is preferably substantially equal to that of the air supplied from the air compressor, which preferably is also supplied to the foil air bearings. This means that the pressure across the labyrinth seals 40 of the fuel gas compressor is equalised, so that little or no gases flow through the seals. Of course, the fuel gas compressor and air compressor rotor characteristics may be selected to provide a slight pressure imbalance if it is desired to apply a positive pressure differential across the seals. A pressure reducer could be also used to maintain a desired pressure differential between the main air supply to the combustor and the bleed air supply to the foil air bearings.

The fuel gas is supplied to the fuel gas compressor rotor 30' via a fuel gas conduit 44 which comprises a bore 44' extending axially through the rotor shaft 16 where it passes through the air compressor rotor 7. The fuel gas conduit 44 extends from the bore via a fuel gas line 45 which extends outwardly from the gas turbine assembly via the air inlet to the gas supply (not shown), and which is sealed to the end of the rotor shaft 16 by a rotating seal 46 (FIGS. 9A-9D), not shown in detail, which may be for example a non-contact dynamic seal or labyrinth seal of conventional design.

Referring to FIGS. 8A-8D and 9A-9D, a gas fired boiler 70 includes a heat exchanger assembly 50' comprising a heat exchanger 50 which is mounted in a use position inside the boiler housing 71. The heat exchanger 50 includes an outer casing 52 having opposed, generally vertical front and rear walls 53, 54 incorporating water filled passageways 55, 56 which form part of a water flowpath 57 surrounding a combustion space 51 within the casing. In the illustrated example, the water flowpath comprises three tubes 58 which are coiled around the combustion space and connected at each end to a respective one of the passageways 55, 56. The passageways are fluidly connected to a hot water supply or space heating system 80 via inlet and outlet fluid connections 60, 61 to form the water flowpath which extends through the passageways 55, 56 and tubes 58.

The front wall includes an air inlet aperture 59 through which the fuel gas line 45 may be arranged to extend to a conventional burner (not shown) mounted in the combustion space 51 to heat the water flowpath through which water is circulated to transfer heat to the system 80. An exhaust outlet aperture 64 is provided in the upper wall of the outer casing 52. An electrical unit 72 is connected via conductors 73 to the grid supply and to the electrical system of the building whereby the boiler is supplied with power and control signals. The foregoing features of the gas boiler and heat exchanger are conventional, and it will be understood that the boiler will typically include other conventional components such as a pressurised expansion tank, water pump and the like which are not illustrated.

Referring to FIGS. 9A-9D, the gas fired boiler 70 of FIGS. 8A-8D is configured as a micro-CHP gas fired boiler 70' by arranging the gas turbine assembly 1 within the combustion space 51 (i.e. substantially within the combustion space 51 so that at least the greater part of the gas turbine assembly is within the combustion space) in place of the conventional burner. The outer casing 52 and gas turbine assembly together define an air flowpath through which air flows in use via the air inlet aperture 59 and the air inlet 4 to the air compressor rotor, from the air compressor rotor via the combustion chamber to the turbine rotor, and from the turbine rotor via the exhaust outlet 5 to the exhaust outlet aperture 64. The water flowpath 57 is heated by the combustion product 78 exhausted from the turbine and the annular water jacket 23 is arranged in fluid communication with the cool return side of the water flowpath 57 and radially inwardly of the air flowpath. Advantageously, this arrangement provides a very compact configuration in which all of the heat exhausted from the gas turbine can be transferred to the heat exchanger without losing heat via additional ducting.

This is achieved with little or no modification to the heat exchanger, except that the water flowpath is interrupted by two fluid ports (not visible in the drawings) which are formed in the inwardly facing wall of the front passageway 55. The gas turbine assembly 1 is connected to the front wall 53 of the heat exchanger at the air inlet aperture 59, conveniently by interposing a gasket between the front plate 21 and the heat exchanger, so that air can flow in through the axially aligned air inlet aperture 59 and air inlet 4, and the fluid ports 22 are in fluid communication, respectively with the two fluid ports formed in the front passageway 55, whereby the cooled water returning from the system 80 and flowing into the front passageway flows through the water jacket 23 before passing into the tubes 58 to the rear passageway 56 and back to the system 80. The generator stator 20 is connected via conductors 74 which pass through a small aperture 75 in the front wall 53 to the electrical unit 72 which supplies the generator with power when it is required to act as a motor and through which the generator delivers its useful electrical output to the grid connection, building loads, battery or other storage device or any other electrical load which the micro-CHP gas fired boiler 70' is arranged to supply.

In the installed position as best seen in FIG. 9D, the exhaust deflector 29 prevents the combustion product 78 flowing axially from the turbine from impinging on the vertical rear wall of the heat exchanger casing, so that the combustion product exhausted from the turbine rotor flows radially outwardly through the annular exhaust outlet into the combustion space 51 where it transfers heat to the coils of the heat exchanger before the cooled gases escape to atmosphere via the exhaust outlet aperture 64 and flue 62 which is fluidly connected to the combustion space. This makes it easier to install the turbine assembly with its length axis in the restricted depth dimension of the boiler without compromising safety or efficiency. In the illustrated example the boiler is a condensing boiler with a condensate drain 63 through which the condensate can run to waste.

Conveniently, the heat exchanger assembly can be readily adapted as necessary to fit different boilers (for example, having fluid inlets and outlets in different positions) without changing the configuration or position of the gas turbine assembly and without any major adaptations to the other components of the boiler, except for the electrical unit 72 which is configured to handle the electrical power from the generator. This makes it simple and cost effective to incorporate the gas turbine assembly into an otherwise conventional boiler without changing its dimensions or form factor, providing a micro-CHP boiler which can compete in the marketplace with conventional boilers of similar heat output. By way of example, the micro-CHP boiler may have an electrical output of about 1 kW-10 kW, conveniently about 2 kW-4 kW, with a heat output of about 15 kW-45 kW.

Advantageously, the air compressor rotor 7 may replace the function of the exhaust fan which is conventionally provided in a gas fired boiler and particularly in a condensing gas fired boiler. Of course, a separate exhaust fan may be provided if desired.

Advantageously, as described above, the gas turbine assembly incorporated into the heat exchanger assembly 50' may include a fuel gas compressor arranged to supply compressed fuel gas to the combustion chamber, the fuel gas compressor including a fuel gas compressor rotor which forms part of the rotor of the gas turbine assembly. Further advantageously, as described above, the fuel gas compressor rotor may be arranged also to function as the thrust runner which transfers axial forces from the shaft to thrust bearings on either side of it.

In the illustrated embodiment the gas turbine assembly operates without a recuperator to preheat the air supply entering the combustion chamber, although a recuperator could be provided if desired.

Optionally, the gas fired boiler may include an additional burner or an additional heat exchanger or bypass ducting and valving so that it can be operated to provide heat only, or a different ratio of heat to electrical power. Alternatively, the supply of fuel gas to the fuel gas compressor can be regulated by suitable valving in the gas supply line so as to alter the heat output from the gas turbine assembly according to the demand for heat.

In summary, a preferred micro-CHP gas boiler comprises a heat exchanger having a combustion space surrounded by a water flowpath, and a gas turbine assembly which is installed in the combustion space. The gas turbine assembly includes a generator surrounded by an annular combustion chamber and cooled by a water jacket which forms part of the flowpath, and a fuel gas compressor which is integrated into the thrust runner on the turbine rotor shaft between foil air bearings.

In this specification, the water jacket and other elements are construed to be "annular" in the sense that they generally encircle or surround the length axis of the gas turbine assembly, for example in a cylindrical configuration, even if they are broken or discontinuous in the circumferential direction. Thus the term "annular" is construed accordingly to mean that the respective element extends substantially around a central axis, and includes in particular a generally cylindrical configuration. Advantageously, the water jacket may be an unbroken annulus (e.g. a cylinder) as shown, which is to say, there are no radial walls between its axial ends to divide it in the circumferential direction. Since any radial walls would act as thermal bridges between its cylindrical inner and outer walls, this allows the water jacket to more effectively protect the generator from the heat of the combustion chamber. Similarly, the combustion chamber may be an unbroken annulus, in particular a cylinder, as shown.

In the illustrated embodiment, the gas turbine assembly includes both an annular combustion chamber and a thrust runner comprising a fuel gas compressor rotor, although in less preferred embodiments either feature could be used separately. Both the annular combustion chamber and the annular water jacket are preferably fluidly continuous around the length axis of the gas turbine assembly, although either or both of them could alternatively be discontinuous or segmented. In yet further, less preferred embodiments, a gas turbine assembly not including an annular combustion chamber or a thrust runner comprising a fuel gas compressor rotor could be arranged within the combustion space of a heat exchanger surrounded by a water flowpath within its outer casing.

Those skilled in the art will appreciate that many other adaptations may be made within the scope of the claims. For example, in less preferred embodiments the fuel gas compressor rotor could be of another type instead of the radial type. The thrust bearings could also be of another type instead of foil air bearings. The generator and combustion chamber could be arranged in a different position. The micro-CHP gas boiler could have a heat exchanger of a different design, for example, with a water flowpath arranged other than as a coil of tubing, or above rather than surrounding the combustion space, with the novel gas turbine assembly being connected to it via suitable ducting.

The invention claimed is:

1. A gas turbine assembly for use in a micro-CHP gas fired boiler, the gas turbine assembly including:
an air inlet;
a rotor assembly;
a generator; and
a combustion chamber;
the generator including a generator rotor and a generator stator;
the rotor assembly including an air compressor rotor, a turbine rotor, and the generator rotor;
the air compressor rotor being arranged to compress air from the air inlet;
the combustion chamber being arranged to combust a fuel gas with the compressed air from the air compressor rotor to produce a combustion product which flows through the turbine rotor to drive the turbine rotor in rotation; and
the turbine rotor being arranged to drive the air compressor rotor and the generator rotor in rotation, wherein the combustion chamber is annular and is arranged around the generator, wherein a water jacket casing is arranged circumferentially about and is spaced radially outward from the generator, and wherein the water jacket casing is disposed radially inward from the combustion chamber.

2. The gas turbine assembly according to claim 1, wherein the generator and the combustion chamber are arranged axially between the air compressor rotor and the turbine rotor.

3. The gas turbine assembly according to claim 1, wherein the air compressor rotor is arranged to supply compressed air to annular, inner and outer plenum chambers arranged respectively radially inwardly and outwardly of the combustion chamber; and a plurality of air inlets are arranged to supply compressed air from the plenum chambers to the combustion chamber.

4. The gas turbine assembly according to claim 1, wherein the turbine rotor comprises a plurality of blades, and the blades define cooling air passages through which air is arranged to flow from the compressor to a tip of each blade without passing through the combustion chamber.

5. The gas turbine assembly according to claim 4, wherein the generator rotor defines a cooling air passage adapted to flow air from the compressor through the generator rotor to the cooling air passages of the turbine rotor blades without passing through the combustion chamber.

6. A gas turbine assembly for use in a micro-CHP gas fired boiler, the gas turbine assembly including:
an air inlet;
a rotor assembly;
a generator; and
a combustion chamber;
the generator including a generator rotor and a generator stator;
the rotor assembly including an air compressor rotor, a turbine rotor, and the generator rotor;
the air compressor rotor being arranged to compress air from the air inlet;
the combustion chamber being arranged to combust a fuel gas with the compressed air from the air compressor rotor to produce a combustion product which flows through the turbine rotor to drive the turbine rotor in rotation; and
the turbine rotor being arranged to drive the air compressor rotor and the generator rotor in rotation; and
the rotor assembly further including a thrust runner and a pair of thrust bearings arranged on opposite sides of the thrust runner to react axial forces from the air compressor and turbine rotor, wherein the thrust runner comprises a fuel gas compressor rotor which is arranged to compress the fuel gas and to transfer said axial forces from the air compressor and the turbine rotor to the thrust bearings.

7. The gas turbine assembly according to claim 6, wherein the thrust bearings are foil air bearings.

8. The gas turbine assembly according to claim 7, wherein the foil air bearings are supplied with compressed air from the air compressor rotor.

9. The gas turbine assembly according to claim 8, wherein the turbine rotor comprises a plurality of blades, and the blades define cooling air passages; and the compressed air supplied to the foil air bearings is arranged to flow through the cooling air passages to a tip of each blade without passing through the combustion chamber.

10. The gas turbine assembly according to claim 9, wherein the generator rotor defines a cooling air passage via which the compressed air supplied to the foil air bearings is arranged to flow through the generator rotor to the cooling air passages of the turbine rotor blades without passing through the combustion chamber.

11. The gas turbine assembly according to claim 6, wherein the fuel gas is supplied to the fuel gas compressor rotor via a fuel gas conduit extending through a rotating rotor shaft of the rotor assembly.

12. The gas turbine assembly according to claim 11, wherein the fuel gas conduit extends outwardly from the air inlet.

13. A heat exchanger assembly for use in a micro-CHP gas fired boiler, the heat exchanger assembly including:
an outer casing, the outer casing having an air inlet aperture and an exhaust outlet aperture; and
a water flowpath surrounding a combustion space, the water flowpath and combustion space being arranged within the outer casing;
wherein the heat exchanger assembly further includes a gas turbine assembly, the gas turbine assembly including:
an air inlet;
an exhaust outlet;
a rotor assembly;
a generator; and
a combustion chamber;
the generator including a generator rotor and a generator stator;
the rotor assembly including an air compressor rotor, a turbine rotor, and the generator rotor;
the air compressor rotor being arranged to compress air from the air inlet;
the combustion chamber being arranged to combust a fuel gas with the compressed air from the air compressor rotor to produce a combustion product which flows through the turbine rotor to drive the turbine rotor in rotation;
the turbine rotor being arranged to drive the air compressor rotor and the generator rotor in rotation;
and wherein the gas turbine assembly is arranged within the combustion space, the outer casing and gas turbine assembly together defining an air flowpath through which air flows in use via the air inlet aperture of the outer casing and the air inlet of the gas turbine assembly to the air compressor rotor, from the air compressor rotor via the combustion chamber to the turbine rotor, and from the turbine rotor via the exhaust outlet of the gas turbine assembly to the exhaust outlet aperture of the outer casing; and a water jacket is arranged circumferentially around the generator between the generator and the combustion chamber; and the water jacket is arranged in fluid communication with the water flowpath and radially inwardly of the air flowpath.

14. The heat exchanger assembly according to claim 13, wherein the heat exchanger assembly is arranged to be mounted in a use position in which the combustion space is arranged between opposed generally vertical front and rear walls of the outer casing; and the front wall includes the air inlet aperture; and the gas turbine assembly is connected to the front wall at the air inlet aperture.

15. The heat exchanger assembly according to claim 13, wherein the generator rotor is provided with a cooling air passage via which air is arranged to flow from the compressor through the generator rotor without passing through the combustion chamber.

16. The heat exchanger assembly according to claim 13, wherein the exhaust outlet is annular and is arranged to direct the combustion product exhausted from the turbine rotor to flow radially outwardly away from the gas turbine assembly into the combustion space.

17. The heat exchanger assembly according to claim 13, wherein the gas turbine assembly includes a fuel gas compressor arranged to supply compressed fuel gas to the combustion chamber, and the fuel gas compressor includes a fuel gas compressor rotor, the fuel gas compressor rotor forming part of the rotor of the gas turbine assembly.

* * * * *